Jan. 5, 1954
R. J. MILLER
2,665,418
WARNING LIGHT FOR VEHICLES
Filed Dec. 7, 1950
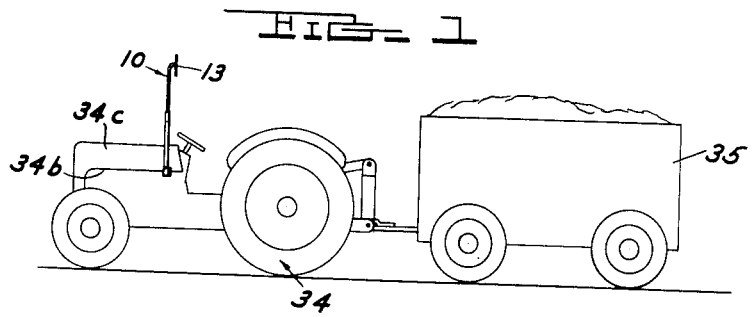
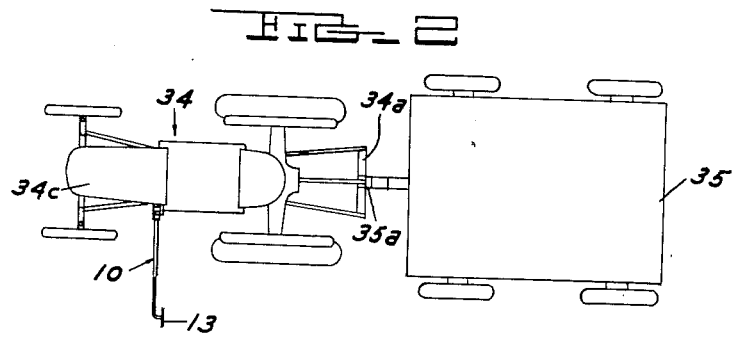
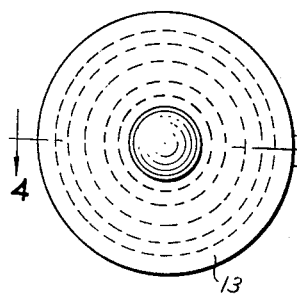
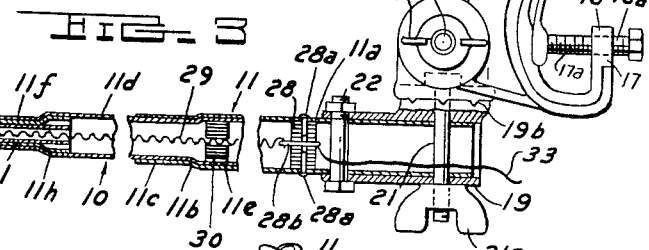
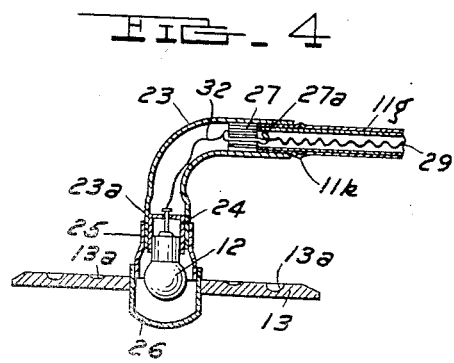
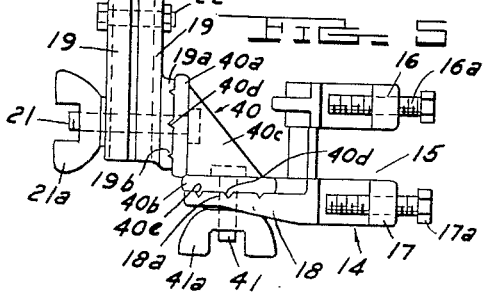
INVENTOR.
RAYMOND J. MILLER
BY
*W. A. Schaich*
ATTORNEY Patented Jan. 5, 1954

2,665,418

UNITED STATES PATENT OFFICE 2,665,418

WARNING LIGHT FOR VEHICLES

Raymond J. Miller, Detroit, Mich., assignor to Dearborn Motors Corporation, Birmingham, Mich., a corporation of Delaware Application December 7, 1950, Serial No. 199,603

12 Claims. (Cl. 340—146)

This invention relates to a safety light and more particularly to a safety light for tractors for use in connection with trailed vehicles.

Farmers frequently have to make use of public highways in towing wagons or trailers loaded with hay, grain or other bulky material and occasionally various large implements such as combines, ensilage choppers, corn pickers etc. It often happens that such vehicles or implements have to be moved in twilight or after dark when the farmer's work is completed. As nearly all tractors are without a rear warning light that would be at all visible when towing a loaded vehicle, the practice of moving towed vehicles or implements on the highway at night is extremely hazardous both to the farmer and to other high speed vehicles on the highway.

It is accordingly, an object of this invention to provide a safety light construction for a tractor which may be readily extended to position a warning light or reflector above or beyond the side of the load or implement towed by the tractor to warn overtaking vehicles on the road.

A further object of this invention is to provide an improved light diffusing lens for a safety light.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Fig. 1 is a reduced scale side elevational view of a tractor towing a loaded trailer illustrating a safety light constructed in accordance with this invention and shown with the safety light projecting above the trailed load.

Fig. 2 is a plan view of Fig. 1 showing the safety light of this invention positioned with the light diffusing element of the safety light projecting beyond the side of the trailed vehicle.

Fig. 3 is an enlarged scale detail view, partially in section, of the safety light.

Fig. 4 is a sectional view taken along the plane 4—4 of Fig. 3.

Fig. 5 is a detailed partial plan view of Fig. 3 showing the clamp arrangement of the safety light.

As shown on the drawings:

In Fig. 3 there is shown in assembled relation a tractor safety light 10 constructed in accordance with this invention. Briefly, safety light 10 comprises a telescoping arm 11 on one end of which there is mounted an electric lamp 12 having a circular reflector or lens 13 surrounding such lamp and on the other end of arm 11 there is provided a mounting bracket 14 for clamping the assembly to any convenient portion of the tractor.

Arm 11 is constructed to permit telescoping thereof so that such arm may be conveniently extended to project above or to one side of the vehicle or other implement towed behind a tractor. Arm 11 comprises a rear tubular portion 11a. The left end (Fig. 3) of rear tubular portion 11a is necked down as shown at 11b to provide a reduced diameter forward end 11c. A central tubular portion 11d of smaller diameter than tube 11a is slidably contained within rear tubular portion 11a and the forward end of the central portion 11d projects out of the reduced diameter end 11c which slidably supports tube 11d at such point. The rear end of central tube 11d is flared outwardly to provide a piston-like head as shown at 11e so that such rear end slidably engages the wall of tube 11a in bearing relationship. The forward end 11f of tube 11d similarly supports a forward tubular portion 11g, the rear end 11h of tube 11g being also flared outwardly to slidably engage the inner wall of tube 11d. Thus the arm 11 of safety light 10 may be extended to a substantial length, the outwardly flared ends 11h and 11e of the tubes 11d and 11a respectively striking the necked down ends of such tubes to limit its extension.

Mounting bracket 14 is preferably a cast member and is essentially U-shaped in configuration as shown in Fig. 3. Bracket 14, however, is bifurcated as shown at 15 in Fig. 5, the bifurcation thereby forming two clamp portions 16 and 17. Clamp portions 16 and 17 are each provided with a transversely disposed threaded hole (not shown) to respectively receive threaded screws 16a and 17a. An integral lug 18 is provided on the rear of mounting bracket 14 opposite clamp 17 as best shown in Fig. 5 and such lug has a transverse hole 18a for a purpose to be presently explained.

An L-shaped bracket 40 is secured to lug 18 as shown in Fig. 5. Bracket 40 comprises a pair of substantially cylindrical base portions 40a and 40b disposed at right angles and are connected by a pair of spaced integral gusset plates 40c. Each of the bases 40a and 40b are respectively provided with a plurality of radial substantially V-shaped lugs or serrations 40d on the outwardly disposed faces thereof and the lugs 40d on base portion 40b of bracket 40 cooperate with corresponding radial indentations 40e provided on the adjacent face of lug 18 of mounting bracket 14. Bracket 40 is secured in a selected position of adjustment to lug 18 by a transverse bolt 41 and a wing nut 41a. Bolt 41 is insertable through a suitable transverse hole in base portion 40b and through hole 18a in lug 18. Base portion 40a of bracket 40 is provided to support the end of tubular arm 11 as will now be described.

A pair of substantially semi-tubular clamp members 19 surround the extreme right hand end of tube 11 as best shown in Figs. 3 and 5 and one of such clamp members is provided with an integral cylindrical boss 19a. Such boss is provided with a plurality of radial indentations 19b on the side surface thereof which cooperate with the corresponding lugs 40d provided on the adjacent face of base portion 40a of bracket 40. A threaded bolt 21 is passed through suitable apertures in the right hand end of clamps 19 and boss 19a thence through a suitable transverse hole in base portion 40a to pivotally secure the end of tubular arm 11 to bracket 40. A wing nut 21a locks such members in any desired position of angular adjustment relative to bracket 40. A transverse bolt 22 secures the forward ends of clamp members 19 to tube 11.

At the outer end of arm 11, one end of a 90° elbow 23 (Fig. 4) snugly fits over the end of tube 11g and stops against an annular bulge 11k. The other end of elbow 23 is enlarged as shown at 23a to receive a lamp socket 24 which mounts electric lamp 12. A lamp housing 25 snugly surrounds the enlarged diameter end 23a of elbow 23 to be secured thereto by friction. A cap 26 of translucent plastic material, surrounds the open end of lamp housing 25 and is secured thereon by a tight frictional fit. The reflecting lens or disc 13 snugly surrounds cap 26 as best shown in Fig. 4, such lens being of red colored translucent plastic material. In any event both cap 26 and lens 13 are preferably constructed from a red dyed transparent plastic material known generically as methylmethacrylate which is noted for its edge lighting properties. By edge lighting properties is meant that the light rays from a light source are so directed by the arrangement of the crystalline structure of such material that light will be emitted only from any edge surface of this material.

Accordingly a plurality of concentric circular grooves 13a are provided on the rear surface of lens 13, each of such grooves being progressively deeper for a purpose to be explained. In producing grooves 13a by machining or other method, the surface of such grooves is preferably left rough. Grooves 13a will then act as a prism and the light rays from the lamp 12 passing radially through the lens 13 will be redirected in a plurality of different directions. Hence some of the light rays will be directed through the front and rear surfaces of lens 13 and grooves 13a will also be plainly visible from the front and rear surfaces of lens 13. In other words, the edge lighting properties of this material are employed to illuminate both surfaces of lens 13 by interrupting the light rays traveling radially through the lens by the grooves 13a to direct such rays to the faces of the lens. The outer deeper groove 13a intercepts light rays not intercepted by the inner groove to illuminate the surfaces of the lens adjacent the peripheral edge thereof. Hence the disc 13 will be visible both from the front and rear. It should be mentioned that, if desired, cap 26 may be integrally molded with lens 13.

A cylinder 27 of electrical insulating material is provided in elbow 23 ahead of tube 11g but adjacent the end thereof. A similar cylinder 28 is provided near the end of tube 11a and is secured in such position as best shown in Fig. 3 by a pair of diametrically opposed screws or pins 28a, such screws also passing through the wall of tube 11a.

The ends of a lead wire in the form of a helically wound coil spring 29 or other suitable extensibly length conductor, are respectively secured by suitable hooks 27a and 28b to the insulating cylinders 27 and 28. Spring lead wire 29 is preferably made of a material which has good electrical conducting properties as well as being capable of maintaining its spring shape. An intermediate insulating block 30 is provided in the rear enlarged end 11e of tube 11b to radially space spring 29 from the wall of such tube. An insulating tube constructed of non-electrical conducting material as shown at 31 is provided in tube 11g. Provision of such a tube therein is necessitated by the much smaller diameter of tube 11g. A lead 32 connects hook 27 to the base of lamp socket 24. A wire 33 suitably connected to the rear end of hook 28b permits connection to a source of electrical energy on the tractor such as a storage battery. The other side of the lamp 12 is grounded to the tubular arm 11 so that when the mounting bracket is connected to any portion of the tractor a complete circuit will be made.

In Figs. 1 and 2 there is shown a tractor 34 towing a trailer 35 connected to the drawbar 34a of tractor 34 as at 35a. Safety light 10 may be conveniently installed by mounting bracket 14 upon tractor 34 in any suitable location. In this instance safety light 10 is preferably mounted on the edge of the tractor hood 34b as shown in Figs. 1 and 2. The mounting bracket 14 is placed in surrounding relationship to hood edge 34b of tractor hood 34c as shown in Fig. 3 and clamping screws 16a and 17a are tightened against such hood to secure the mounting bracket thereto. Arm 11 of safety light 10 may then be conveniently adjusted to the vertical position shown in Fig. 1 or to the horizontal position shown in Fig. 2 or any intermediate angular position by means of the wing nut 41a and bolt 41, the co-operating serrated surface of lug 18 and of washer 19a being engageable with one another to lock arm 11 in the desired position of adjustment. In addition to the adjustments above described, arm 11 of safety light 10 may be conveniently adjusted to lie alongside of the hood 34c of tractor 34 by unloosening wing nut 21a and rotating such arm forwardly until it assumes the desired position whereupon wing nut 21a is tightened to secure arm 11 in such position. The serrated surfaces of base portion 40a and of boss 19a effectively lock arm 11 in any selected position of adjustment. Hence arm 11 may be universally positioned relative to its mounting point on the tractor and secured in any selected position. The telescopic construction of arm 11 conveniently permits adjustment of such arm to permit reflector disc 13 to project above the load carried in the trailer (Fig. 1) or beyond the side thereof, as shown in Fig. 2.

From the foregoing description it will be clearly apparent that there is here provided a simple, effective warning light which may be readily and conveniently mounted upon any suitable portion of the tractor whereby such light may be projected beyond the load carried in a trailed vehicle or beyond the sides of any implement towed behind the trailer to warn oncoming motorists of the presence of such a vehicle and its load on the highway. It is further pointed out that its simplicity and ruggedness of design make its use on a tractor entirely feasible as there are but a minimum of parts to get out of order and due to the nature of its construction, such light mount will stand considerable abuse. The warning light may be readily and conveniently adjusted to any desired location with but a minimum of effort, hence little extra time is required for greatly increasing the safety of the tractor operator when on the highway as well as reducing the hazard to traffic. The unique construction of the diffusing lens insures visibility of the warning light from front or rear, or at any angle.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a trailed vehicle, a safety light comprising a hollow arm formed from a plurality of telescoping elements, a disc-shaped light diffusing lens including a light source mounted on one end of said arm, and means for mounting the other end of said arm on said tractor, said means permitting universal positioning of said arm, whereby said diffusing lens may be positioned beyond the extremities of said trailed vehicle.

2. For use with a tractor having a trailed vehicle, a safety light comprising a tubular arm formed from a plurality of telescoping elements, a mounting bracket pivotally secured to one extremity of said arm, said mounting bracket having a clamp portion for attachment of said bracket to said tractor, means for locking said arm in a desired position of angular adjustment relative to said bracket, and a disc-shaped light diffusing lens including a light source mounted on the other extremity of said arm, said arm being extensible whereby said diffusing lens is positioned beyond the extremities of said trailed vehicle.

3. In a safety light, a hollow support arm formed from a plurality of telescoping elements, a light socket mounted on one end of said arm, a helically wound resilient wire connected to said light socket, and longitudinally spaced means for axially supporting said lead wire in said hollow arm.

4. In a safety light, a tubular support arm formed from a plurality of telescoping elements, a light socket including a lamp mounted on one end of said arm, a wire in the arm connected at one end to said lamp socket, a plurality of tubular insulator members, longitudinally spaced in said arm, said wire traversing the bore of all of said insulator members whereby said lead wire is spaced from contact with said arm.

5. In a safety light having an electrically conductive tubular arm formed from a plurality of telescoping elements, a light socket including a lamp mounted on one end of said arm, a helically wound spring-like lead wire connected to said light socket, and means for axially spacing said wire from the wall of said arm in non-electrical conducting relationship thereto, said arm forming a second lead wire whereby power is supplied to said lamp in all extensions of said arm.

6. In a safety light, a socket adapted to mount a light bulb, a disc of translucent material having a central aperture, and means for mounting said disc with said aperture in surrounding relation to the light bulb.

7. In a safety light, a socket adapted to mount a light bulb, a translucent cup shaped element secured to said socket and adapted to surround the light bulb, and a disc of translucent material having a central aperture, said cup-shaped element being constructed and arranged to fit within said central aperture whereby said disc is mounted in surrounding relation to the light bulb.

8. In a safety light having a light socket including a lamp, the improvement comprising a disc-like light transmitting member having an integral axial dome shaped hub portion, said member being formed of material having edge lighting properties, said hub portion being constructed and arranged for mounting on the light socket, and means on said disc member for diffusing the light rays from the lamp whereby both faces of said disc-like member are illuminated.

9. The combination defined in claim 8 wherein said means comprises a groove in one of the faces of said disc-like member, the bottom of said groove having a roughened surface.

10. The combination defined in claim 8 wherein said means comprises a plurality of concentric grooves in one of the faces of said disc-like member, the bottom of said grooves having a roughened surface.

11. The combination defined in claim 8 wherein said means comprises a plurality of concentric grooves in one of the faces of said disc-like member, each of said grooves having a greater depth than the inwardly adjacent groove.

12. In a safety light having a light socket including a lamp, the improvement comprising a disc-like light transmitting member having a central aperture, said member being formed of material having edge lighting properties, means for mounting said member on the socket with said aperture in surrounding relationship to the lamp, and a groove on one of the faces of said member disposed intermediate said aperture and the peripheral edge of said member.

RAYMOND J. MILLER.

References Cited in the file of this patent

UNITED STATES PATENTS

| Number | Name | Date |
|---|---|---|
| 1,193,539 | Gray | Aug. 8, 1916 |
| 1,211,447 | Houze | Jan. 9, 1917 |
| 1,260,966 | Cassady | Mar. 26, 1918 |
| 1,558,579 | Bishop | Oct. 27, 1925 |
| 2,094,514 | Zika et al. | Sept. 28, 1937 |
| 2,503,974 | Sparaco | Apr. 11, 1950 |